US012705976B2

(12) United States Patent
Han et al.

(10) Patent No.: US 12,705,976 B2
(45) Date of Patent: Aug. 11, 2026

(54) METHOD OF DETECTING VEHICLE MISBEHAVIOR USING RADIO WAVE CHARACTERISTIC

(71) Applicant: SAESOL TECH Inc., Anyang-si (KR)

(72) Inventors: JunHyouk Han, Hwaseong-si (KR); Junwoo Kim, Anyang-si (KR); Jaewoo Jang, Uiwang-si (KR)

(73) Assignee: SAESOL TECH Inc., Anyang-si (KR)

( * ) Notice: Subject to any disclaimer, the term of this patent is extended or adjusted under 35 U.S.C. 154(b) by 0 days.

(21) Appl. No.: 19/073,027

(22) Filed: Mar. 7, 2025

(65) Prior Publication Data

US 2026/0188110 A1 Jul. 2, 2026

(30) Foreign Application Priority Data

Dec. 31, 2024 (KR) ........................ 10-2024-0202080

(51) Int. Cl.
*G08G 1/052* (2006.01)
*G01S 11/10* (2006.01)
*G08G 1/01* (2006.01)

(52) U.S. Cl.
CPC .............. *G08G 1/052* (2013.01); *G01S 11/10* (2013.01); *G08G 1/0116* (2013.01)

(58) Field of Classification Search
CPC ........ G08G 1/052; G08G 1/0116; G01S 11/10
See application file for complete search history.

(56) References Cited

U.S. PATENT DOCUMENTS 11,553,346 B2 * 1/2023 Yang et al. .......... G05D 1/0088
12,132,635 B1 * 10/2024 Petit et al. .............. H04L 43/16

FOREIGN PATENT DOCUMENTS

| | | | |
|---|---|---|---|
| JP | 2010-503299 | A | 1/2010 |
| KR | 10-2016-0134450 | A | 11/2016 |
| KR | 10-2022-0140740 | A | 10/2022 |
| KR | 10-2023-0017122 | A | 2/2023 |
| KR | 10-2023-0137928 | A | 10/2023 |
| KR | 10-2023-0141783 | A | 10/2023 |
| KR | 10-2023-0144542 | A | 10/2023 |
| KR | 10-2023-0160250 | A | 11/2023 |
| KR | 10-2024-0124910 | A | 8/2024 |

OTHER PUBLICATIONS

Korean Office Action mailed on Jul. 9, 2025 from Ministry of Intellectual Property for Application No. 10-2024-0202080.
Korean Notice of Allowance mailed on Jan. 21, 2026 from Ministry of Intellectual Property for Application No. 10-2024-0202080.

* cited by examiner

*Primary Examiner* — Brodie J Follman

(57) ABSTRACT

Provided is a method of detecting vehicle misbehavior using a radio wave characteristic. Unlike an existing vehicle misbehavior detection method, according to the method of detecting vehicle misbehavior using a radio wave characteristic, a vehicle does not detect misbehavior or another vehicle, and vehicle misbehavior is detected on the basis of difference between vehicle-related information included in a message transmitted to a vehicle by a road side unit (RSU) and information derived from a radio wave characteristic of a received signal.

7 Claims, 5 Drawing Sheets

METHOD OF DETECTING VEHICLE MISBEHAVIOR USING RADIO WAVE CHARACTERISTIC

CROSS-REFERENCE TO RELATED APPLICATION(S)

This application claims priority from Korean Patent Application No. 10-2024-0202080, filed on Dec. 31, 2024, in the Korean Intellectual Property Office, the disclosure of which is incorporated herein by reference in its entirety.

BACKGROUND

1. Field

The following description relates to a vehicle-to-everything (V2X) technology, and more particularly, to a technology for a road side unit (RSU) to detect a vehicle that performs misbehavior using a radio wave characteristic.

2. Description of Related Art

Vehicle-to-everything (V2X) is a communication technology for exchanging various information including traffic-related information with infrastructure, a personal terminal, or the like installed in another vehicle, a road, or the like via a wired and/or wireless network. V2X is a concept encompassing all forms of communication that is applicable to vehicles traveling on roads, including vehicle-to-vehicle (V2V) communication, vehicle-to-infrastructure (V2I) communication, vehicle-to-pedestrian (V2P) communication, and the like.

Autonomous driving works by collecting data using sensors, collecting data about the surroundings of a path through V2X communication, collecting data through communication with a remote server, and more. Autonomous driving relies on sensors, such as a camera, a radar, lidar, and the like on board a vehicle to identify a surrounding situation and control the vehicle accordingly. Relying solely on sensors for autonomous driving may lead to risks, such as a traffic accident and the like, in the event of a sensor's misrecognition or failure. Therefore, autonomous driving additionally involves information sharing based on V2X communication and communication with a remote server.

Autonomous vehicles share information, such as a vehicle's position, speed, and the like, with nearby vehicles and traffic infrastructure using a V2X message transmitted and received between on-board units (OBUs). In this way, autonomous vehicles may not only obtain sensor information of individual vehicles but may also recognize surroundings, which may reduce the possibility of accidents occurring.

An autonomous vehicle can transmit a V2X message only when a public key infrastructure (PKI)-based security credential management system (SCMS) determines that the autonomous vehicle has a legitimate registration certificate, to prevent anyone from sharing wrong information.

However, even when a vehicle has a legitimate V2X certificate, information sent by the vehicle may be wrong, and nearby vehicles that receive the wrong information may misinterpret the information, which increases the risk of great confusion. For example, a Global Positioning System (GPS) sensor on board a vehicle may malfunction and send wrong position information to nearby vehicles, which may lead to a collision.

The act of sharing wrong V2X information with a cooperative-intelligent transport system (C-ITS) environment is called misbehavior. A vehicle that performs such misbehavior is detected by other vehicles, and the corresponding misbehavior is identified at a vehicle level and transmitted to a misbehavior authority (MA) of an SCMS.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description relates to providing a method in which a road side unit (RSU) compares information on a vehicle included in a message received from a vehicle-to-everything (V2X) communication device on board the vehicle with information derived from a radio wave characteristic used for transmitting the message to detect misbehavior of the vehicle.

Technical objects to be achieved in the present invention are not limited to those described above, and other technical objects that have not been described will be clearly understood by those of ordinary skill in the art from the following description.

In one general aspect, a method of detecting vehicle misbehavior using a radio wave characteristic is performed by an RSU installed at a fixed location on a roadside, and includes a first speed acquisition operation, a second speed calculation operation, an anomaly message reception judgment operation, and a misbehavior detection (MBD) judgment operation.

In the first speed acquisition operation, a first speed of a vehicle which is traveling in a communication coverage is acquired from a basic safety message (BSM) received from a V2X communication device on board the vehicle.

In the second speed calculation operation, a second speed of the vehicle is calculated using a frequency shift caused by the Doppler effect of a signal received from the V2X communication device.

In the anomaly message reception judgment operation, a difference between the first speed and the second speed is compared with a set reference error to determine whether an anomaly message has been received.

In the MBD judgment operation, when a number of anomaly messages received from the vehicle exceeds a set first reference value, the vehicle is determined as misbehaving vehicle to generate a misbehavior report (MBR).

The MBD judgment operation may additionally include determining the vehicle as a misbehaving vehicle to generate an MBR when a number of anomaly messages received from the vehicle during a first time period exceeds a set second reference value.

The second speed calculation operation may additionally include analyzing an angle of arrival (AoA) of the signal received from the V2X communication device to correct the frequency shift caused by the Doppler effect.

In another general aspect, a method of detecting vehicle misbehavior using a radio wave characteristic is performed by an RSU installed at a fixed location on a roadside, and includes a range calculation operation, a vehicle range reception operation, a vehicle position calculation operation, a position error calculation operation, an anomaly message reception judgment operation, and an MBD judgment operation.

In the range calculation operation, a range from a vehicle which is traveling in a communication coverage is calculated using a signal transmission time included in a BSM received from a V2X communication device on board the vehicle and a time of signal arrival.

In the vehicle range reception operation, range information of the vehicle, which is calculated by each of two or more neighboring RSUs using a time of signal arrival, is received from the two or more RSUs.

In the vehicle position calculation operation, a position of the vehicle is calculated using triangulation on the basis of location information of the RSUs, the calculated range from the vehicle, and the received range information of the vehicle.

In the position error calculation operation, a position error between position information of the vehicle included in the received BSM and the calculated position of the vehicle is calculated.

In the anomaly message reception judgment operation, the calculated position error is compared with a reference range error to determine whether an anomaly message has been received.

In the MBD judgment operation, when a number of anomaly messages received from the vehicle exceeds a set first reference value, the vehicle is determined as misbehaving vehicle to generate a misbehavior report (MBR).

The MBD judgment operation may additionally include determining the vehicle as a misbehaving vehicle to generate an MBR when a number of anomaly messages received from the vehicle during a first time period exceeds a set second reference value.

The range calculation operation may include analyzing a received signal strength indicator (RSSI) of a signal received from the V2X communication device to correct the range from the vehicle or measuring a roundtrip time (RTT) of a signal between the RSU and the V2X communication device to correct the time of signal arrival.

Other features and aspects will be apparent from the following detailed description, the drawings, and the claims.

Figure 1:
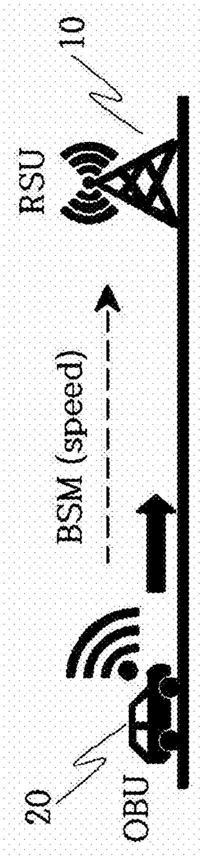
FIG. 1 is a conceptual diagram illustrating a method of detecting vehicle misbehavior using a radio wave characteristic according to a first aspect of the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described and additional aspects will be specified through exemplary embodiments described with reference to the accompanying drawings. It will be understood that components of each of the embodiments may be variously combined within the embodiment unless otherwise stated or contradicted. Each block of block diagrams may represent a physical part in some cases, or may be a logical representation of some functions of one physical part or a function of a plurality of physical parts in other cases. In some cases, the entity of a block or a part of the block may be a set of program instructions. All or some of these blocks may be implemented as hardware, software, or a combination thereof.

A vehicle-to-everything (V2X) communication device may be included in an intelligent transport system (ITS), particularly, a cooperative-ITS (C-ITS), to perform all or some functions of the ITS. The V2X communication device may perform communication between vehicles, between a vehicle and infrastructure, between a vehicle and a mobile device of a pedestrian, and the like. The V2X communication device may correspond to an on-board unit (OBU) or may be included in an OBU. The V2X communication device may correspond to a road side unit (RSU) in the infrastructure or may be included in an RSU. Therefore, the V2X communication device may be included in a V2X communication device installed in a vehicle and an RSU. The description of the present invention will focus on a cellular V2X (C-V2X) communication method.

Misbehavior means that a V2X communication device of a vehicle intentionally or unintentionally transmits a message with false or wrong content. Misbehavior may affect normal operation of the V2X function of other vehicles and is classified as intentional transmission and unintentional transmission.

Intentional misbehavior means a case of transmitting a message including erroneous information in a specific situation due to a logical error in a program that performs a V2X communication function or a case of intentionally transmitting an anomaly message due to an attacker's malicious manipulation (e.g., using a pseudonym certificate for vehicle control). Unintentional misbehavior means a case in which some field values of an externally transmitted C-V2X message are incorrect or wrongfully changed due to damage to or a failure of a vehicle sensor, or external interference (e.g., vehicle position information of the C-V2X message is wrong or wrongfully changed due to interference from a global navigation satellite system (GNSS) signal).

A misbehavior message may pass signature verification and a protocol conformance test, but not a rationality test. When a vehicle uses a C-V2X message, it is necessary to not only determine whether the message is authentic (i.e., whether a signature is correct and a certificate is valid) but also verify the rationality of field values in the C-V2X message. C-V2X message rationality includes the rationality of field values within a single message, the rationality of field value changes between consecutive messages, and the rationality of a C-V2X message and other sensor detection results. When an anomaly is observed in a C-V2X message transmitted by a vehicle, an anomaly report process may be triggered.

According to the related art, a vehicle that performs such misbehavior is detected by other vehicles, and the corresponding misbehavior is transmitted to a misbehavior authority (MA) of a security credential management system (SCMS) at a vehicle level.

For example, when a V2X communication device of a vehicle detects that the interval between basic safety messages (BSMs) transmitted by another vehicle is too short, static field data (e.g., BasicVehicleClass, VehicleWidth, VehicleLength, or VehicleHeight) of a BSM message transmitted by another vehicle is changed, the position (Position3D) of a vehicle changes in two consecutive BSMs received from the same vehicle excessively relative to the speed of the vehicle, the speed of a vehicle is too fast for its type, the reverse speed of a vehicle is too fast, or the speed of a vehicle changes too abruptly, the V2X communication device may determine that the vehicle is a misbehavior vehicle.

Figure 2:
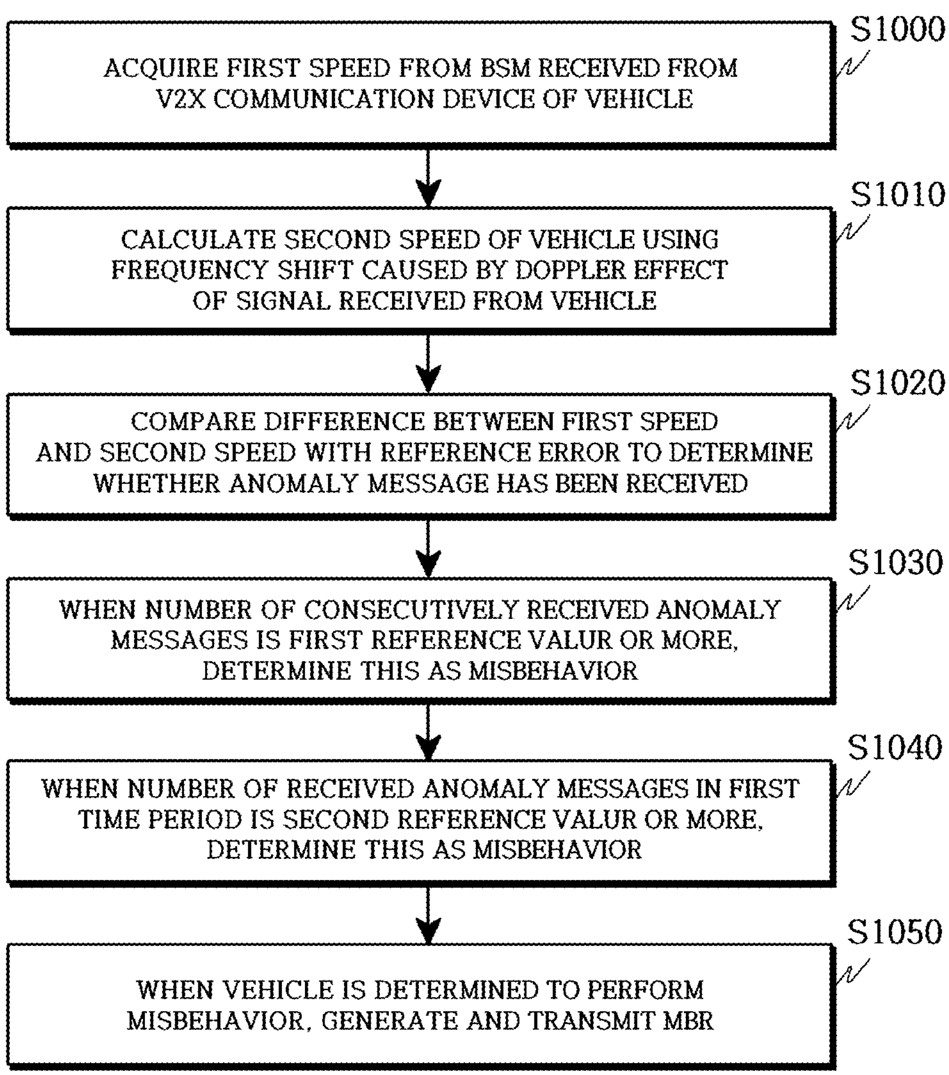
FIG. 2 is a flowchart illustrating the method of detecting vehicle misbehavior using a radio wave characteristic according to the first aspect of the present invention.

FIG. 1 is a conceptual diagram illustrating a method of detecting vehicle misbehavior using a radio wave characteristic according to a first aspect of the present invention, and FIG. 2 is a flowchart illustrating the method of detecting vehicle misbehavior using a radio wave characteristic according to the first aspect of the present invention. The method of detecting vehicle misbehavior using a radio wave characteristic according to the first aspect of the present invention is performed by an RSU installed at a fixed location on a roadside, and includes a first speed acquisition operation, a second speed calculation operation, an anomaly message reception judgment operation, and a misbehavior detection (MBD) judgment operation.

At least some functions of the first speed acquisition operation, the second speed calculation operation, the anomaly message reception judgment operation, and the MBD judgment operation may be implemented by a set of computer program instructions executed by a processor of an RSU 10.

In the first speed acquisition operation S1000, a first speed of a vehicle which is traveling in a communication coverage is acquired from a BSM received from a V2X communication device 20 on board the vehicle.

The V2X communication device 20 installed in the vehicle transmits a BSM at intervals of about 100 ms. Accordingly, the RSU 10 periodically receives a BSM from the V2X communication device 20 within the communication coverage.

V2X communication provides a safety service using a BSM. The BSM includes Global Positioning System (GPS) information (latitude, longitude, and the like), vehicle state information (speed, azimuth, object data, and the like), and the like. It is possible to recognize nearby objects from the BSM.

The RSU 10 may acquire the first speed of the vehicle from speed information of the vehicle included in the BSM.

In the second speed calculation operation S1010, a second speed of the vehicle is calculated using a frequency shift caused by the Doppler effect of a signal received from the V2X communication device 20. In other words, the RSU 10 calculates the speed of the vehicle using a radio wave characteristic of a wireless signal transmitted by the V2X communication device 20 installed in the traveling vehicle. The RSU 10 is installed at a fixed location and thus can calculate the speed of a vehicle using a radio wave characteristic that changes in accordance with the travel speed of the vehicle, that is, a frequency shift caused by the Doppler effect.

A frequency band used in C-V2X communication is 5.9 GHZ. The frequency of a signal transmitted by a vehicle that travels straight toward the RSU 10 is shifted due to the Doppler effect when received by the RSU 10. When the travel speed of the vehicle moving straight toward the RSU 10 is 100 km/h, a frequency shift caused by the Doppler effect is 54.63 Hz. This is calculated using Equation 1.

$$\Delta f = \frac{v}{c} \times f \qquad \text{[Equation 1]}$$

Here, v is the speed (m/s) of a vehicle, c is the speed of light ($3\times10^8$ (m/s)), and f is an original frequency (Hz).

In the anomaly message reception judgment operation S1020, the difference between the first speed and the second speed is compared with a set reference error to determine whether an anomaly message has been received.

For example, the RSU 10 may set a frequency measurement error and a signal processing error to +1 Hz to calculate an error. A speed error caused by this error, that is, the set reference error, may be calculated as 0.1828 km/h. This is calculated using Equation 2 derived from Equation 1.

$$v_{error} = \frac{\Delta f_{error} \times c}{f} \qquad \text{[Equation 2]}$$

However, the reference error is not limited thereto and may be set to any value (km/h).

When the difference between the first speed and the second speed is greater than the set reference error, the RSU 10 counts the signal as an anomaly message.

In the MBD judgment operation S1030, when the number of consecutively received anomaly messages becomes a set first reference value, this is determined as MBD to generate a misbehavior report (MBR). The RSU 10 does not determine that the vehicle performs misbehavior whenever it is determined that an anomaly message has been received, but determines that the vehicle performs misbehavior when a certain number of anomaly messages are consecutively received, that is, when a number of anomaly messages corresponding to the set first reference value are consecutively received. In this case, the RSU 10 generates and transmits an MBR message to an MA (S1050).

Additionally, when the number of anomaly messages received in a first time period is a set second reference value or more in the MBD judgment operation S1040, the RSU 10 may determine this as vehicle MBD to generate an MBR. In other words, in addition to the case of consecutively receiving anomaly messages from a specific vehicle, when the number of anomaly messages received in the determined first time period (e.g., one minute) is a specific number of times (the second reference value) or more, the RSU 10 may determine the vehicle as a misbehavior vehicle.

Additionally, the second speed calculation operation S1010 may include an operation of analyzing an angle of arrival (AoA) of a signal received from the V2X communication device 20 to correct a frequency shift caused by the Doppler effect. When the RSU 10 is not in the travel direction of the vehicle, that is, straight ahead of the vehicle, but is at a certain angle with respect to the travel direction, it is necessary to correct a method of applying the Doppler effect. The RSU 10 may analyze the AoA of the signal transmitted by the vehicle to calculate the angle between the travel direction of the vehicle and a straight line between the vehicle and the RSU 10, may only reflect a linear speed in the direction of the RSU 10 using the angle to correct the Doppler effect, and may calculate the second speed in consideration of a frequency shift based on the corrected Doppler effect.

Figure 3:
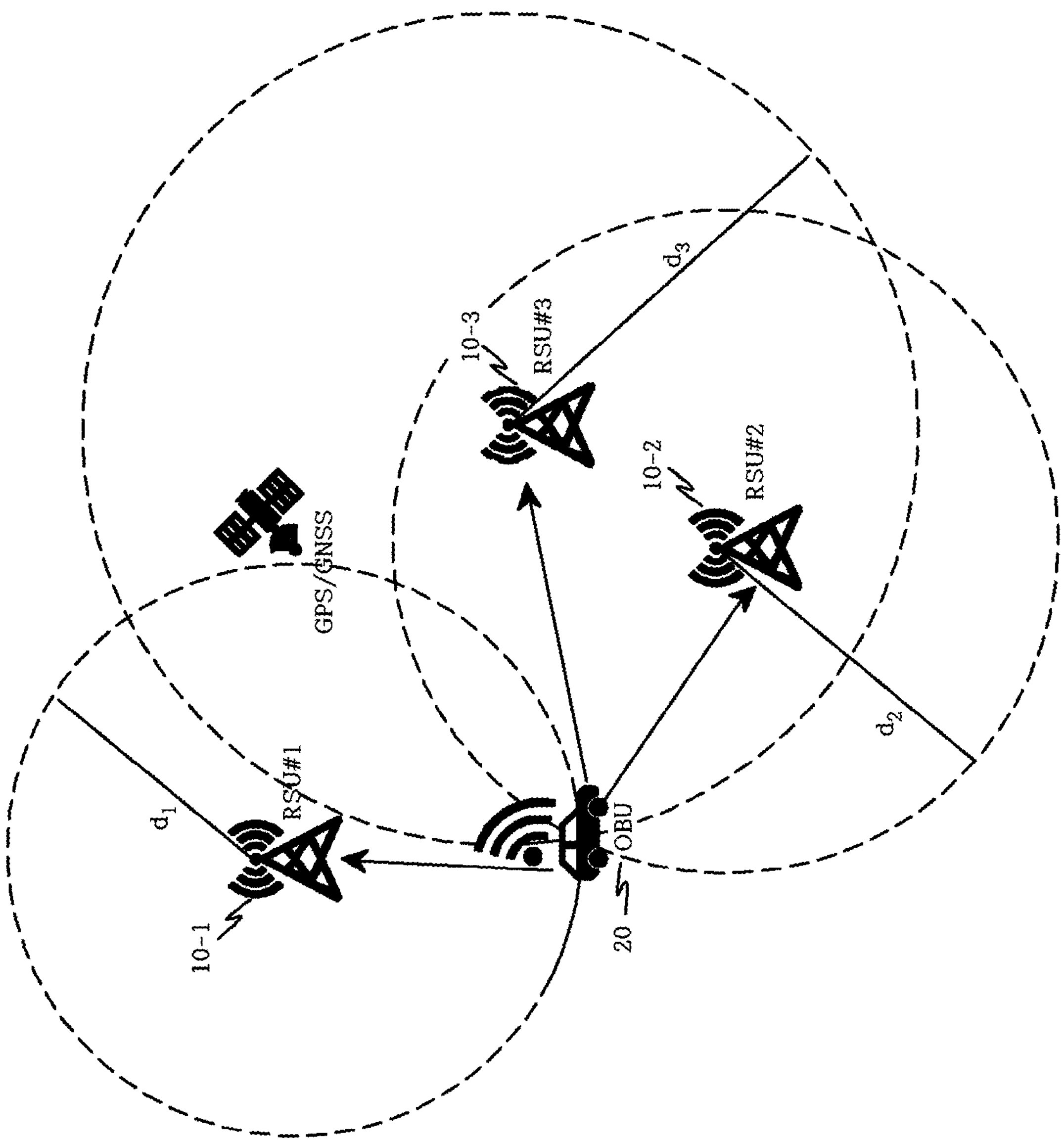
FIG. 3 is a conceptual diagram illustrating a method of detecting vehicle misbehavior using a radio wave characteristic according to a second aspect of the present invention.
Figure 4:
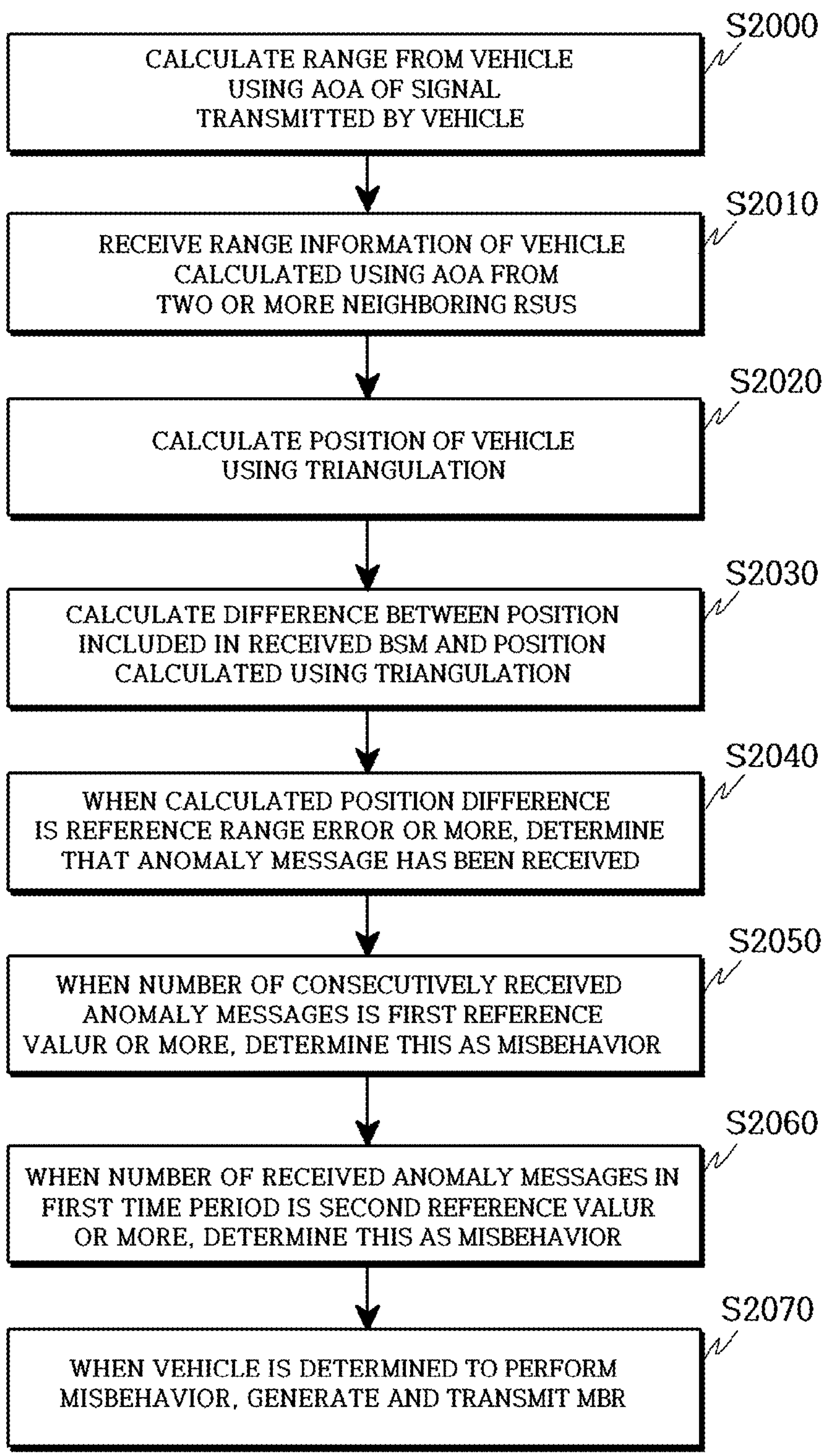
FIG. 4 is a flowchart illustrating the method of detecting vehicle misbehavior using a radio wave characteristic according to the second aspect of the present invention.

FIG. 3 is a conceptual diagram illustrating a method of detecting vehicle misbehavior using a radio wave characteristic according to a second aspect of the present invention, and FIG. 4 is a flowchart illustrating the method of detecting vehicle misbehavior using a radio wave characteristic according to the second aspect of the present invention. The method of detecting vehicle misbehavior using a radio wave characteristic according to the second aspect of the present invention is performed by an RSU 10-1 installed at a fixed location on a roadside, and includes a range calculation operation S2000, a vehicle range reception operation S2010, a vehicle position calculation operation S2020, a position error calculation operation S2030, an anomaly message reception judgment operation S2040, and an MBD judgment operation S2050.

At least some functions of the range calculation operation S2000, the vehicle range reception operation S2010, the vehicle position calculation operation S2020, the position error calculation operation S2030, the anomaly message reception judgment operation S2040, and the MBD judgment operation S2050 may be implemented by a set of computer program instructions executed by a processor of the RSU 10-1.

As shown in FIG. 3, in the method of detecting vehicle misbehavior using a radio wave characteristic according to the second aspect, at least three RSUs 10-1, 10-2, and 10-3 measure the position of a vehicle in conjunction with each other. Also, it is assumed that all the RSUs 10-1, 10-2, and 10-3 and the vehicle are visually synchronized with each other using GPS or GNSS.

In the range calculation operation S2000, a range from the vehicle which is traveling in a communication coverage is calculated using a signal transmission time included in a BSM received from a V2X communication device 20 on board the vehicle and a time of signal arrival. The range from the vehicle that receives a signal, that is, the BSM, transmitted by the vehicle, may be calculated from a transmission time included in the signal and a time at which the signal arrives at the RSU 10-1. In this case, however, it is possible to know only the range, and information from at least two additional RSUs 10-2 and 1-3 is required for measuring the accurate position of the vehicle.

In the vehicle range reception operation S2010, the range information of the vehicle, which is calculated by each of the at least two neighboring RSUs 10-2 and 10-3 using the time of signal arrival, is received from the at least two RSUs 10-2 and 10-3. To measure the accurate position of the vehicle, the RSU 10-1 receives ranges from the vehicle, which are calculated using times of arrival, from the other nearby RSUs 10-2 and 10-3.

In the vehicle position calculation operation S2020, the position of the vehicle is calculated using triangulation on the basis of location information of the RSUs, the calculated range from the vehicle, and the received range information of the vehicle. Detailed description of triangulation will be omitted, but FIG. 3 shows the concept of this method. Since the location information of the RSUs is known in advance, the RSU 10-1 may measure the position of the vehicle using triangulation on the basis of a range d1 from the vehicle calculated by the RSU 10-1, and ranges d2 and d3 from the vehicle received from the other RSUs 10-2 and 10-3 as shown in FIG. 3.

In the position error calculation operation S2030, a position error between position information of the vehicle included in the received BSM and the calculated position of the vehicle is calculated. As described above, the BSM includes the position information (Position3D) of the vehicle.

In the anomaly message reception judgment operation S2040, the calculated position error is compared with a reference range error to determine whether an anomaly message has been received.

In the position error calculation operation S2030, the RSU 10-1 may assume a GPS or GNSS time error of 100 ns, convert the time error into a range error, and correct the range error for an error of 30 m to calculate a reference range error. However, 30 m may not be used as it is, and 17.32 m obtained by correcting the position error using triangulation ( $$\left(\Delta d_{position} \approx \frac{\Delta d_{range}}{\sqrt{N}},\right.$$

N is the number of RSUs) may be used as the reference range error.

In the MBD judgment operation S2050, when the number of consecutively received anomaly messages becomes a set first reference value, this is determined as MBD to generate an MBR. The RSU 10-1 does not determine that the vehicle performs misbehavior whenever it is determined that an anomaly message has been received, but determines that the vehicle performs misbehavior when a certain number of anomaly messages are consecutively received, that is, when a number of anomaly messages corresponding to the set first reference value are consecutively received. In this case, the RSU 10-1 generates and transmits an MBR message to an MA (S2070).

Additionally, when the number of anomaly messages received in a first time period is a set second reference value or more in the MBD judgment operation S2050, the RSU 10-1 may determine this as vehicle MBD to generate an MBR (S2060). In other words, in addition to the case of consecutively receiving anomaly messages from a specific vehicle, when the number of anomaly messages received in the determined first time period (e.g., one minute) is a specific number of times (the second reference value) or more, the RSU 10-1 may determine the vehicle as a misbehavior vehicle.

Additionally, the range calculation operation S2000 may include an operation of analyzing a received signal strength indicator (RSSI) of a signal received from the V2X communication device 20 to correct the range from the vehicle or an operation of measuring a roundtrip time (RTT) of a signal between the RSU 10-1 and the V2X communication device 20 to correct the time of signal arrival.

Since a technology for correcting the range between the RSU 10-1 and the vehicle that has transmitted the signal by analyzing the RSSI is well known, detailed description thereof will be omitted.

Also, the time of signal arrival may be corrected using the RTT which is obtained by exchanging messages between the RSU 10-1 and the V2X communication device 20 of the vehicle, and the range between the RSU 10-1 and the vehicle may be corrected using the corrected time of signal arrival.

The RSU 10-1 may determine the position of the vehicle using triangulation on the basis of ranges that are corrected in the same way by the other RSUs 10-2 and 10-3.

Figure 5:
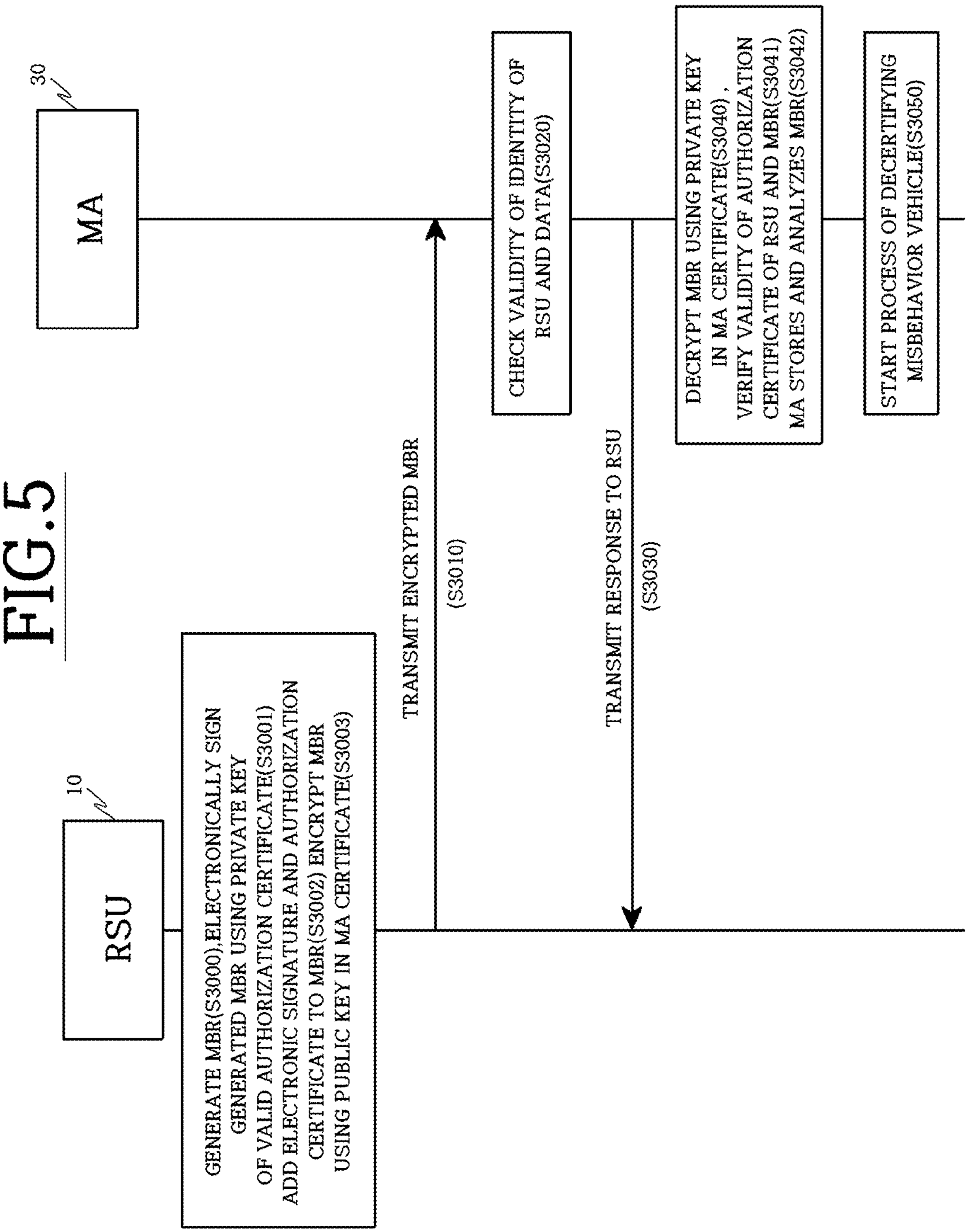
FIG. 5 is a sequence diagram conceptually illustrating a process of providing a misbehavior report (MBR) through a road side unit (RSU) according to the present invention.

FIG. 5 is a sequence diagram conceptually illustrating a process of providing an MBR through an RSU according to the present invention. When a vehicle misbehavior is detected, an RSU 10 generates an MBR (S3000) and reports the misbehavior of the corresponding vehicle to an MA 30. The RSU 10 electronically signs the generated MBR using a private key of a valid authorization certificate (S3001), adds the electronic signature and the authorization certificate to the MBR (S3002), and then encrypts the MBR using a public encryption key of the MA 30 (S3003). Since the encrypted MBR can be decrypted by the MA 30 only, the RSU 10 transmits the encrypted MBR to the MA 30 in a safe manner (S3010). When the MBR is received, the MA 30 checks whether the identity of the RSU 10, which has transmitted the MBR, and the received data are valid (S3020) and then transmits a response (S3030). In this case, the response may be a null response for the hypertext transfer protocol (HTTP) (or HTTP secure (HTTPS)). The MA 30 decrypts the received MBR using its private encryption key (S3040), checks validity of the identity of the RSU 10 and the received data using the electronic signature and an authorization certificate (S3041), and then stores and analyzes the MBR (S3042). When misbehavior is detected after MBRs of multiple RSUs and vehicles are accumulated and analyzed, the MA 30 starts a process of decertifying a vehicle that performs misbehavior as necessary (S3050).

According to the present invention, an RSU compares information on a vehicle included in a message received from a V2X communication device on board the vehicle with information derived from a radio wave characteristic used for transmitting the message to detect misbehavior of the vehicle.

Although the present invention has been described through exemplary embodiments with reference to the accompanying drawings, the present invention is not limited thereto and should be construed to encompass various modified examples that can be apparently derived from the embodiments by those of ordinary skill in the art. The claims are intended to encompass these modified examples.

What is claimed is:

1. A method of detecting vehicle misbehavior using a radio wave characteristic performed by a road side unit (RSU) installed at a fixed location on a roadside, the method comprising:

a first speed acquisition operation of acquiring a first speed of a vehicle which is traveling in a communication coverage from a basic safety message (BSM) received from a vehicle-to-everything (V2X) communication device on board the vehicle;

a second speed calculation operation of calculating a second speed of the vehicle using a frequency shift caused by a Doppler effect of a signal received from the V2X communication device;

an anomaly message reception judgment operation of comparing a difference between the first speed and the second speed with a set reference error to determine whether an anomaly message has been received; and a misbehavior detection (MBD) judgment operation of determining, when a number of anomaly messages received from the vehicle exceeds a set first reference value, the vehicle as misbehaving vehicle to generate a misbehavior report (MBR).

2. The method of claim 1, wherein the MBD judgment operation additionally comprises determining the vehicle as a misbehaving vehicle to generate an MBR when a number of anomaly messages received from the vehicle during a first time period exceeds a set second reference value.

3. The method of claim 1, wherein the second speed calculation operation comprises analyzing an angle of arrival (AoA) of the signal received from the V2X communication device to correct the frequency shift caused by the Doppler effect.

4. A method of detecting vehicle misbehavior using a radio wave characteristic performed by a road side unit (RSU) installed at a fixed location on a roadside, the method comprising:

a range calculation operation of calculating a range from a vehicle which is traveling in a communication coverage using a signal transmission time included in a basic safety message (BSM) received from a vehicle-to-everything (V2X) communication device on board the vehicle and a time of signal arrival;

a vehicle range reception operation of receiving range information of the vehicle, which is calculated by each of two or more neighboring RSUs using a time of signal arrival from the two or more RSUs;

a vehicle position calculation operation of calculating a position of the vehicle using triangulation on the basis of location information of the RSUs, the calculated range from the vehicle, and the received range information of the vehicle;

a position error calculation operation of calculating a position error between position information of the vehicle included in the received BSM and the calculated position of the vehicle;

an anomaly message reception judgment operation of comparing the calculated position error with a reference range error to determine whether an anomaly message has been received; and a misbehavior detection (MBD) judgment operation of determining, when a number of anomaly messages received from the vehicle exceeds a set first reference value, the vehicle as misbehaving vehicle to generate a misbehavior report (MBR).

5. The method of claim 4, wherein the MBD judgment operation additionally comprises determining the vehicle as a misbehaving vehicle to generate an MBR when a number of anomaly messages received from the vehicle during a first time period exceeds a set second reference value.

6. The method of claim 4, wherein the range calculation operation comprises analyzing a received signal strength indicator (RSSI) of a signal received from the V2X communication device to correct the range from the vehicle.

7. The method of claim 4, wherein the range calculation operation comprises measuring a roundtrip time (RTT) of a signal between the RSU and the V2X communication device to correct the time of signal arrival.

* * * * *